US012739272B2

(12) United States Patent
Torres et al.

(10) Patent No.: US 12,739,272 B2
(45) Date of Patent: Sep. 15, 2026

(54) CYBERSECURITY VULNERABILITY DETECTION WITH ARTIFICIAL INTELLIGENCE MODELS

(71) Applicant: CrowdStrike, Inc., Sunnyvale, CA (US)

(72) Inventors: Ian Torres, Spring Branch, TX (US); Alexander Nazarian, Potomac, MD (US); Arnd Korn, Berlin (DE)

(73) Assignee: CrowdStrike, Inc., Sunnyvale, CA (US)

( * ) Notice: Subject to any disclaimer, the term of this patent is extended or adjusted under 35 U.S.C. 154(b) by 140 days.

(21) Appl. No.: 18/753,724

(22) Filed: Jun. 25, 2024

(65) Prior Publication Data

US 2025/0392610 A1 Dec. 25, 2025

(51) Int. Cl.
*H04L 9/40* (2022.01)
*H04W 24/02* (2009.01)

(52) U.S. Cl.
CPC ......... *H04L 63/1433* (2013.01); *H04W 24/02* (2013.01)

(58) Field of Classification Search
CPC ........................... H04L 63/1433; H04W 24/02
See application file for complete search history.

(56) References Cited

U.S. PATENT DOCUMENTS 12,238,140 B2 * 2/2025 Bazalgette ............. G06F 21/57
12,244,629 B2 * 3/2025 Korge ...................... G06N 3/04
2019/0280918 A1 * 9/2019 Hermoni ............... G06F 18/214
2021/0314340 A1 * 10/2021 Ubriani .................. G06N 3/082
2022/0021704 A1 * 1/2022 Irimie ................... G06F 21/566
2024/0333741 A1 * 10/2024 Abdelrahman ...... G06Q 20/382
2025/0047708 A1 * 2/2025 Albero ................ H04L 63/1491
(Continued)

FOREIGN PATENT DOCUMENTS

CA 3226148 A1 * 1/2023 ......... H04L 63/1416
CN 113810406 A 12/2021
(Continued)

OTHER PUBLICATIONS

Standen, Max et al. CybORG: A Gym for the Development of Autonomous Cyber Agents. Defense Science and Technology Group, IJCAI-21 1st International Workshop on Adaptive Cyber Defense, arXiv:2108.09118v1 [cs.CR], Aug. 20, 2021, pp. 1-7.
(Continued)

*Primary Examiner* — Sarah Su
(74) *Attorney, Agent, or Firm* — Womble Bond Dickinson (US) LLP

(57) ABSTRACT

The present disclosure provides techniques for red teaming with artificial intelligence (AI) models. A processing device generates, via a first AI model, an agent action space based on security data, where the agent action space is indicative of actions to perform to potentially compromise at least one of a computing system, a network, or an application. The processing device performs a reinforcement learning process with an agent based on the agent action space to obtain a log of the reinforcement learning process. The processing device generates, via a second AI model, a report based on the security data and at least a portion of the log, where the report is indicative of a security weakness of the at least one of the computing system, the network, or the application.

20 Claims, 5 Drawing Sheets

(56) References Cited

U.S. PATENT DOCUMENTS

2025/0168186 A1* 5/2025 Mcdonald ........... H04L 63/1433
2025/0247408 A1* 7/2025 Bubshait ............. H04L 63/1425
2025/0280029 A1* 9/2025 Kim ........................ H04L 63/20
2025/0350993 A1* 11/2025 Kawamura ........... H04W 48/16
2025/0358300 A1* 11/2025 Mohamed Nabeel ....................... H04L 63/1425
2025/0365313 A1* 11/2025 Mushtaq ............. H04L 63/1483
2026/0067314 A1* 3/2026 Pell Reddy ......... H04L 63/1425

FOREIGN PATENT DOCUMENTS

CN 116545687 A 8/2023
CN 117834228 A 4/2024
CN 119155099 A * 12/2024 ......... H04L 63/1441
CN 119254452 A * 1/2025 ......... H04L 63/1425
WO WO-2021151356 A1 * 8/2021 ............. G16H 10/60
WO WO-2021171090 A1 * 9/2021 ............... G06N 7/01
WO WO-2024199620 A1 * 10/2024 ............ H04W 24/02
WO WO-2025097073 A1 * 5/2025 ......... H04L 63/1433
WO WO-2025147550 A2 * 7/2025 ......... H04L 63/1441
WO WO-2026024864 A1 * 1/2026 ........... G06Q 20/405

OTHER PUBLICATIONS

Kujanpaa, Kalle et al. Automating Privilege Escalation with Deep Reinforcement Learning. arXiv2110.01362v1 [cs.CR] Oct. 4, 2021, pp. 1-12.

Rigaki, Maria et al. Out of Cage: How Stochastic Parrots Win in Cyber Security Environments, DOI: 10.5220/0012391800003636, In Proceedings of the 16th International Conferene on Agents and Artificial Intelligence (ICAART 2024) vol. 3, pp. 774-784, [retrieved on Jun. 12, 2024]. Retrieved from the Internet <URL: https://www.scitepress.org/publishedPapers/2024/123918/pdf/index.html>.

Yang, Yizhou et al. Behaviour-Diverse Automatic Penetration Testing: A Curiousity-Driven Multi-Objective Deep Reinforcement Learning Approach. National Research Centre of Parallel Computer Engineering and Technology, arXiv:2202.10630v1 [cs.LG] Feb. 22, 2022, pp. 1-7, [retrieved on Jun. 12, 2024]. Retrieved from the Internet <URL: https://arxiv.org/pdf/2202.10630>.

* cited by examiner

CYBERSECURITY VULNERABILITY DETECTION WITH ARTIFICIAL INTELLIGENCE MODELS

TECHNICAL FIELD

Aspects of the present disclosure relate to cybersecurity, and more particularly, to cybersecurity vulnerability detection with artificial intelligence (AI) models.

BACKGROUND

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing mathematical and computational frameworks used to extract patterns and insights from data. Large language models (LLMs), a category within machine learning models, are trained on vast amounts of text data to capture the nuances of language and context. Reinforcement learning models, another category within machine learning models, are trained to find a balance between exploration of uncharted territory and exploitation of current knowledge with the goal of maximining a long term reward. By combining advanced machine learning techniques with enormous datasets, large language models harness data-driven approaches to achieve highly sophisticated language understanding and generation capabilities. AI models include machine learning models, large language models, and other types of models that are based on neural networks, genetic algorithms, expert systems, Bayesian networks, reinforcement learning, decision trees, or combination thereof.

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
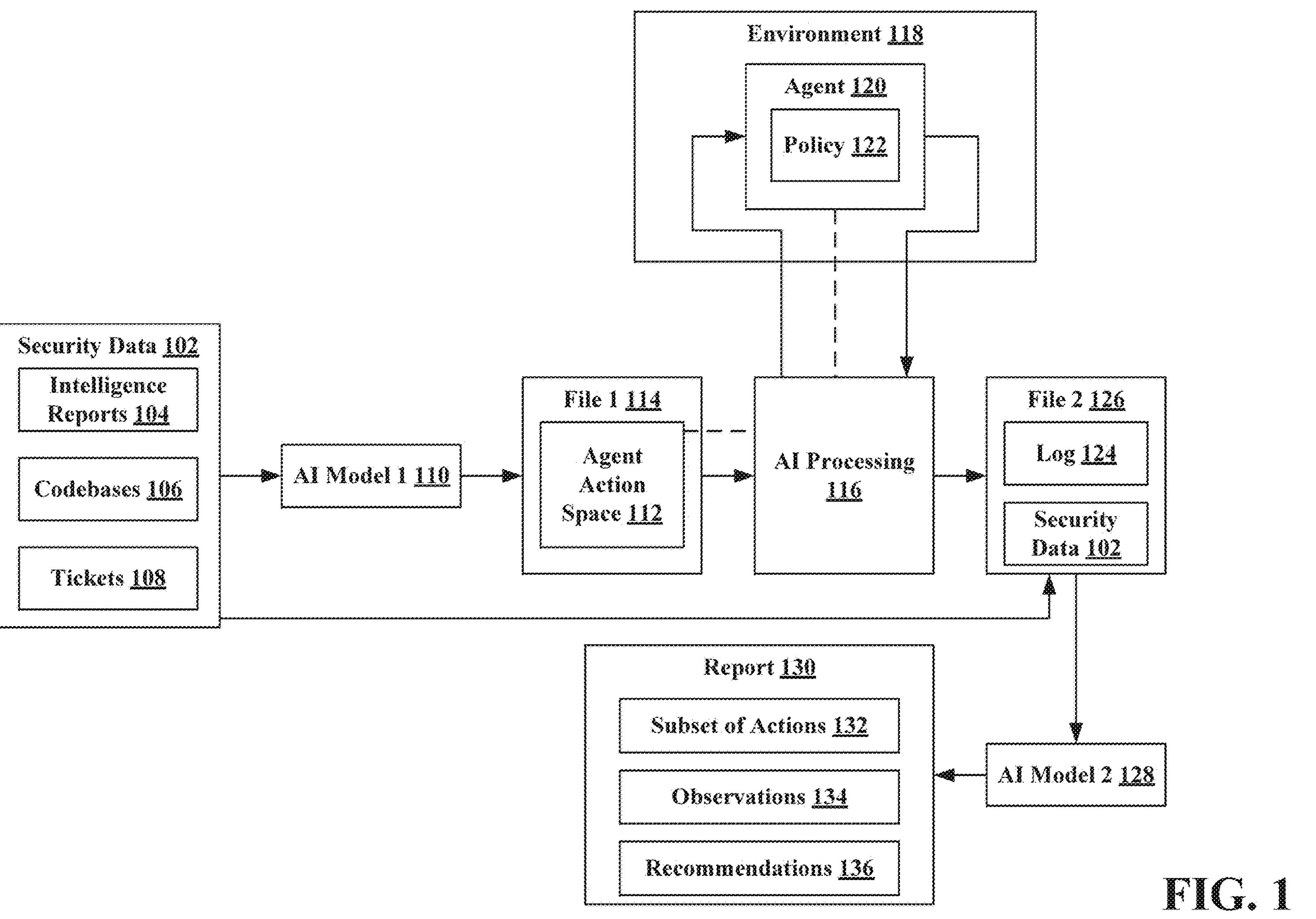
FIG. 1 is a block diagram that illustrates an example of a system for cybersecurity vulnerability detection with AI models in accordance with some aspects of the present disclosure.

Cybersecurity refers to the practice of protecting computer systems, networks, and digital assets from theft, damage, unauthorized access, and various forms of cyber threats. One technique for cybersecurity may include red teaming. In red teaming, computing device(s) (referred to hereafter as "red team computing devices") of a first cybersecurity team (referred to hereafter as a "red team") of an organization attempt to compromise computing systems, networks, and/or applications of the organization (or another organization) by testing cybersecurity mechanisms of the computing systems, the networks, and/or the applications. In an example, the red team computing devices may utilize a security vulnerability to gain access (or attempt to gain access) to the computing systems, the networks, and/or the applications. For example, the red team may gain access to the computing systems, the networks, and/or the applications via theft of user credentials or social engineering techniques. The red team computing devices may then perform reconnaissance to discover additional security vulnerabilities of the computing systems, the networks, and/or the applications while avoiding detection. In contrast, in blue teaming, computing device(s) (referred to hereafter as "blue team computing devices") of a second cybersecurity team (referred to hereafter as a "blue team") of the organization (or another organization) attempt to maintain integrity of the computing systems, the networks, and/or the applications against attacks by the red team computing devices. In purple teaming, the red team and the blue team may work in conjunction with one another to test and defend attacks against the computing systems, the networks, and/or the applications.

Some red teaming techniques may suffer from various deficiencies. For instance, the red team computing devices may generate code as part of performing red team related activities. This may entail receiving and processing extensive manual input, which may be burdensome on computing resources of the red team computing devices. Furthermore, the code may not be configured to test all vulnerabilities of a computing system, a network, and/or an application. Additionally, after red teaming is performed, the red team computing devices may receive further manual input in order to generate human-readable reports that summarize actions performed by the red team for finding security weaknesses, which may also be burdensome on the computing resources of the red team computing devices.

The present disclosure addresses the above-noted and other deficiencies by using a processing device to perform cybersecurity vulnerability detection with AI models. In an example, the processing device generates, via a first AI model, an agent action space based on security data, where the agent action space is indicative of actions to perform to potentially compromise at least one of a computing system, a network, or an application. The processing device performs a reinforcement learning process with an agent based on the agent action space to obtain a log of the reinforcement learning process. The processing device generates, via a second AI model, a report based on the security data and at least a portion of the log, where the report is indicative of a security weakness of the at least one of the computing system, the network, or the application.

As discussed herein, the present disclosure provides an approach that improves the operation of a computer system by reducing an amount of input used to test for security weaknesses. In addition, the present disclosure provides an improvement to the technological field of cybersecurity by discovering potential security weaknesses not discovered by some red teaming techniques. Thus, vis-à-vis, generating, via the first AI model, the agent action space based on the security data, performing the reinforcement learning process with the agent based on the agent space to obtain the log, and generating, via the second AI model, the report based on the security data and the at least the portion of the log, the processing device may improve the operation of a computer system and improve the technological field of cybersecurity as described above.

FIG. 1 is a block diagram 100 that illustrates an example of a system for cybersecurity vulnerability detection with AI models in accordance with some aspects of the present disclosure. A computing system (e.g., the computing system in FIG. 4, the machine in FIG. 5, a set of computing devices, etc.) obtains security data 102. In an example, the computing system may receive the security data 102 from one or more sources (not depicted in FIG. 1) over a network. In some aspects, the computing system may obtain and store the security data 102 in computer-readable storage.

The security data 102 may be indicative of a cybersecurity threat to a computing system, a network, and/or an application. As used herein, a cybersecurity threat may refer to a potential negative action or negative event facilitated by a vulnerability that results in an unwanted impact to a computing system, a network, and/or an application. The security data 102 may include intelligence reports 104 (or a single intelligence report). The intelligence reports 104 may include findings of cybersecurity threats by cybersecurity researchers or other persons, indications of potential new cybersecurity threats, and/or mitigation strategies for cybersecurity threats. In some aspects, the intelligence reports 104 may include reports from different time periods (e.g., different months of a year, different quarters of a year, etc.). In an example, the intelligence reports 104 may include details pertaining to privilege escalation. Privilege escalation may refer to exploiting a bug, a design flaw, or a configuration oversight in an operating system or software application in order to gain elevated access to resources that are normally protected from an application or a user.

The security data 102 may include codebases 106 (or one codebase) that is associated with cybersecurity threats. For example, the codebases 106 may include code that facilitates performing cyberattacks and/or code that mitigates cyberattacks. In some aspects, the codebases 106 may be stored in a developer platform that allows developers to create, store, manage, and share code. In some aspects, the computing system may obtain the codebases 106 from public code repositor(ies) and/or private code repositor(ies). In an example, the codebases 106 may include code associated with privilege escalation.

The security data 102 may include tickets 108 (i.e., support tickets). The tickets 108 may include indications of events (e.g., cybersecurity associated events) that are to be investigated. In an example, the tickets 108 may be from users of an organization to which the computing system belongs or from users of another organization that the organization services. In an example, the tickets 108 may be associated with a bug tracking system, an issue tracking system, or a project management system.

The computing system may obtain and/or have access to a first AI model 110. The first AI model 110 may be trained (e.g., by the computing system or another computing system) to generate agent action spaces (described in greater detail below), that is, the first AI model 110 may include learned parameters (not depicted in FIG. 1), such as weights, that are influenced by a training process with training data, and the first AI model 110 may generate agent action spaces based on the learned parameters and an input. In an example, the first AI model 110 may be or include a first large language model (LLM). In one aspect, the first AI model 110 is a general purpose LLM that is generally configured to interpret and/or generate language, and the computing system fine-tunes the general purpose LLM to produce a fine-tuned LLM that is configured to generate the agent action spaces. Fine-tuning may refer to an approach to transfer learning in which parameters of a pre-trained model are trained on new data. Fine-tuning may be performed on an entire AI model or on a subset of parameters (e.g., layers) of the AI model. In some aspects, fine-tuning may entail augmenting an AI model with adapters that include parameters associated with a specific task. In some aspects, the first AI model 110 is hosted at the computing system. In other aspects, the first AI model 110 is hosted at a different computing system (e.g., in a cloud-based computing platform).

The computing system may generate an agent action space 112 based on the security data 102 (e.g., the intelligence reports 104, the codebases 106, and/or the tickets 108) and the first AI model 110 (e.g., based on learned parameters of the first AI model 110, such as weights). With more particularity, the computing system may provide the security data 102 (or a portion thereof) to the first AI model 110. The computing system may obtain the agent action space 112 as an output of the first AI model 110 based on the learned parameters of the first AI model 110 and the input. The agent action space 112 is indicative of one or more actions that an agent (i.e., a reinforcement learning agent) may perform in order to potentially compromise a computing system, a network, and/or an application. In an example with respect to privilege escalation, the agent action space 112 may include a first action for creating a malicious executable in an OS and a second action for overwriting a dynamic link library (DLL).

In some aspects, providing the security data 102 as input to the first AI model 110 may include transmitting the security data 102 over a network to a system that hosts the first AI model 110 and obtaining the agent action space 112 as the output may include receiving the security data 102 over the network from the system that hosts the first AI model 110.

In one aspect, an action of the agent action space 112 may include code (i.e., code that can be executed by a processing device) and metadata. In an example, the code may be or include code for privilege escalation and the metadata may include an indication of an operating system (OS) that the code is configured to perform the privilege escalation thereon. In another example, the metadata may indicate an interface (e.g., a command line interface (CLI), a web browser, etc.) for the action. In one aspect, an action of the agent action space 112 is a tactic, technique, or a procedure (TTP). A tactic may refer to a high-level description of a behavior of an actor (e.g., a reinforcement learning (RL) agent), a technique may refer to a detailed description of the behavior of the actor, and a procedure may refer to a low-level implementation (i.e., a highly detailed description) of the behavior. In one aspect, the computing system may generate the agent action space 112 in a first file 114. In an example the first file 114 may be a markup file, such as an extensible markup language (XML) file, a Javscript Object Notation (JSON) file, or a Yet Another Markup Language (YAML) file.

In some aspects, the agent action space may include first actions that are indicated by the security data 102 and second actions that are not indicated by the security data 102. Stated differently, the security data 102 may be devoid of the second actions. For instance, the first AI model 110 may automatically generate the second actions based on the first actions and learned parameters of the first AI model 110 in order to expand the agent action space 112 beyond what is indicated by the security data 102.

In one aspect, the computing system may process the security data 102 (or a portion thereof) to generate a first prompt. In an example, the first prompt may be or include "Generate code for different techniques for privilege escalation based on the security data." The computing system may provide the first prompt as an input to the first AI model 110. The computing system may obtain the agent action space 112 as an output of the first AI model based on the first prompt.

In some aspects, the computing system may generate multiple files for each item of security data, where each file in the multiple files includes an agent action space corresponding an item of security data. For instance, the computing system, via the LLM may generate a file for the intelligence reports 104 that includes an agent action space corresponding to the intelligence reports 104, a file for the codebases 106 that includes an agent action space corresponding to the codebases 106, and a file for the tickets 108 that includes an agent action space corresponding to the tickets 108.

The computing system may perform AI processing 116 based on the agent action space 112. For instance, the computing system may perform the AI processing 116 based on the first file 114 (or the multiple files) described above. The AI processing 116 may include performing a reinforcement learning (RL) process. RL may refer to an interdisciplinary area of machine learning and optimal control pertaining to how an intelligent agent (i.e., an agent 120) ought to take actions in an environment 118 (i.e., a dynamic environment) in order to maximize a cumulative reward. RL may find a balance between exploration of new territory in the environment 118 and exploitation of current knowledge of the environment 118 to maximize a long term reward, where feedback may be incomplete or delayed. In some aspects, the AI processing 116 may also include agent packaging (i.e., performing steps to set up the environment 118 and the agent 120), agent training, and policy optimization (described below). In some aspects, the AI processing 116 may be performed by a RL processor that is implemented in hardware and/or software. In some aspects, the AI processing 116 may be/include/be associated with a simulation, a virtual machine, and/or a live environment.

In some aspects, an RL process may be modeled as a Markov decision process that includes a set of environment and agent states of the agent 120, a set of actions (i.e., the agent action space 112) of the agent 120, a probability of transitioning from a first state to a second state under a particular action, and an immediate reward (e.g., provided by a reward function) for the agent 120 after transitioning from the first state to the second state. At discrete time steps, the agent 120 may receive a current state and a reward. The agent 120 may select an action in the agent action space 112 which is then sent to the environment 118. The environment 118 transitions to a new state and a reward associated with the transition is determined. The goal of the RL process may be to learn a policy 122 that maximizes an expected cumulative reward. The environment 118 and the agent 120 may be implemented in software (e.g., machine-executable instructions). In some aspects, the AI processing 116 may conclude when the cumulative reward reaches a stable value.

In an example, during the AI processing 116, the computing system may provide the agent 120 with an action (or an indication thereof) in the agent action space 112. As noted above, the action may be code (e.g., source code, machine code, etc.) or a TTP. The agent may perform the action in the environment 118. The agent 120 may receive a reward for performing an action in the agent action space 112 that results in successful privilege escalation. In some aspects, the action may include multiple actions, where an end goal of the multiple actions is successfully performing privilege escalation.

The computing system may generate a log 124 of the AI processing 116 (e.g., the RL process) as the AI processing 116 (e.g., the RL process) is performed. The log 124 may be indicative of performance of the agent 120 during the RL process. The log 124 may include parameters of the RL process. In one aspect, the log 124 may include an indication of action(s) performed by the agent 120 and cumulative rewards associated with the action(s). In one aspect, the log 124 may include an episode return, an episode length, a solve rate, a total number of environment steps, an amount of time of the RL process, a number of steps per second of the RL process, a state/action value function, a policy entropy, Kullback-Leibler (KL) divergence, network weights/gradients/activations histograms, policy/value/quality losses, and/or aggregated statistics (e.g., a mean, a standard deviation, a minimum value, a maximum value, a median, etc.).

In some aspects, the computing system may generate the log 124 within a second file 126. In some aspects, the computing system may copy the security data 102 (e.g., the intelligence reports 104, the codebases 106, and/or the tickets 108) into the second file 126. The log 124 and the security data 102 may be indicative of TTPs and security weaknesses. Security weaknesses may include a gap or a vulnerability in a computing system, a network, and/or an application. A gap may refer to a deficiency in a security posture (e.g., being able to bypass telemetry) of a system. A vulnerability may refer to a particular deficiency (e.g., a software deficiency) in the system. In some aspects, the computing system may generate multiple files for each item of security data.

The computing system may obtain and/or have access to a second AI model 128. The second AI model 128 may be different from the first AI model 110. The second AI model 128 may be trained (e.g., by the computing system or another computing system) to generate reports (e.g., red teaming reports) that are indicative of a security weakness in a computing system, a network, and/or an application, that is, the second AI model 128 may include learned parameters (not depicted in FIG. 1), such as weights, that are influenced by a training process with training data and the second AI model 128 may generate reports based on the learned parameters and an input. In an example, the second AI model 128 may be or include a second LLM. In one aspect, the second AI model 128 may be a general purpose LLM that is generally configured to interpret and/or generate language, and the computing system may fine-tune the general purpose LLM to produce a fine-tuned LLM that is configured to generate the reports. In some aspects, the second AI model 128 may be hosted at the computing system. In other aspects, the second AI model 128 may be hosted at a different computing system (e.g., in a cloud-based computing platform).

The computing system may generate a report 130 based on the log 124, the security data 102 (e.g., the intelligence reports 104, the codebases 106, and/or the tickets 108), and the second AI model 128. With more particularity, the computing system may provide the security data 102 (or a portion thereof) and the log 124 (or a portion thereof) to the second AI model 128. In some aspects, the computing system may provide the second file 126 as input to the second AI model 128. The computing system may obtain the report 130 as an output of the second AI model 128 based on the learned parameters of the second AI model 128 and the input. The report 130 may be indicative of a security weakness of a computing system, a network, and/or an application. For instance, the report 130 may indicate an action (or actions) in the agent action space 112 that, during the AI processing 116 (i.e., the RL process), compromised at least one of a computing system, a network, or an application. In an example with respect to privilege escalation, the report 130 may indicate that creating a malicious executable led to a successful privilege escalation during the AI processing 116.

In some aspects, providing the security data 102 (or the portion thereof) and the log 124 (or the portion thereof) as input to the second AI model 128 may include transmitting the security data 102 (or the portion thereof) and the log 124 (or the portion thereof) over the network to a system that hosts the second AI model 128 and obtaining the report 130 as the output may include receiving the report 130 over the network from the system that hosts the second AI model 128.

In some aspects, the computing system may process the security data 102 (or the portion thereof) and/or the log 124 (or the portion thereof) to generate a second prompt. In an example, the second prompt may be or include "Write a red teaming report based on the security data and the log." The computing system may provide the second prompt as input to the second AI model 128. The computing system may obtain the report 130 based on the second prompt.

In some aspects, the report 130 may be or include a red teaming report. The red teaming report may include an indication of a subset of actions 132 in the agent action space 112 that led to security weakness(es). The red teaming report may also include observations 134 corresponding to the subset of actions 132. The red teaming report may also include recommendations 136 for mitigating the security weaknesses.

The computing system may output the report 130. For example, the computing system may store the report 130 in computer-readable storage (not depicted in FIG. 1). In another example, the computing system may transmit the report 130 over a network. In a further example, the computing system may present the report 130 on a display (not depicted in FIG. 1).

Red teaming and general fuzzing may rely on user expertise, creativity, and trial and error and may entail considerable resources (e.g., computing resources, user resources, etc.) and cost. Fuzzing may refer to an automated software testing technique that involves providing invalid, unexpected, or random data as inputs to a computer program or computer system in order to reveal defects and/or vulnerabilities of the computer program and/or the computer system. In an example, a fuzzing tool may inject the inputs into the computer program and/or the computer system and the fuzzing tool may monitor exceptions such as crashes and/or information leakage. Furthermore, it may be unclear as to whether red teaming and/or general fuzzing discover all possible security vulnerabilities of the computer program and/or the computer system.

Some techniques for penetration testing (i.e., "pentesting") and emulation scripting support may increase a speed of red teaming tasks. However, pentesting effort (e.g., script writing), as well as follow up activities such as describing the pentesting and/or reporting tasks in a red/blue/purple teaming effort may be subject to human expertise and write-up, and may entail significant resource utilization (i.e., computing resource utilization), time, and costs.

In one aspect described herein, reinforcement learning (RL) allows for solving a formalized problem (i.e., a formalized cybersecurity problem) through a sequence of actions. LLM integration may provide for interpretability and documentation of a red teaming effort (i.e., a red teaming process) and remediation suggestions of the red teaming effort. Additionally, LLM integration may support expanding an action space of an RL task. For example, the LLM integration may support the automatic writing of computer-executable code based on the Open Worldwide Application Security Project (OWASP) sources and/or intelligence threat reports for tactics, techniques, and procedures (TTPs) of interest. The LLM integration may create a faster feedback loop compared to red teaming efforts by supporting the automation of several steps in a gap analysis workflow while generating relevant artifacts (e.g., reports) that demonstrate efficacy, replicability, or mitigation of cybersecurity related threats. Thus, the combination of RL for TTPs of interest and LLM integration for action space expansion, automated command line interpretation, and report generation may provide for improvements in the technical field of cybersecurity.

Figure 2:
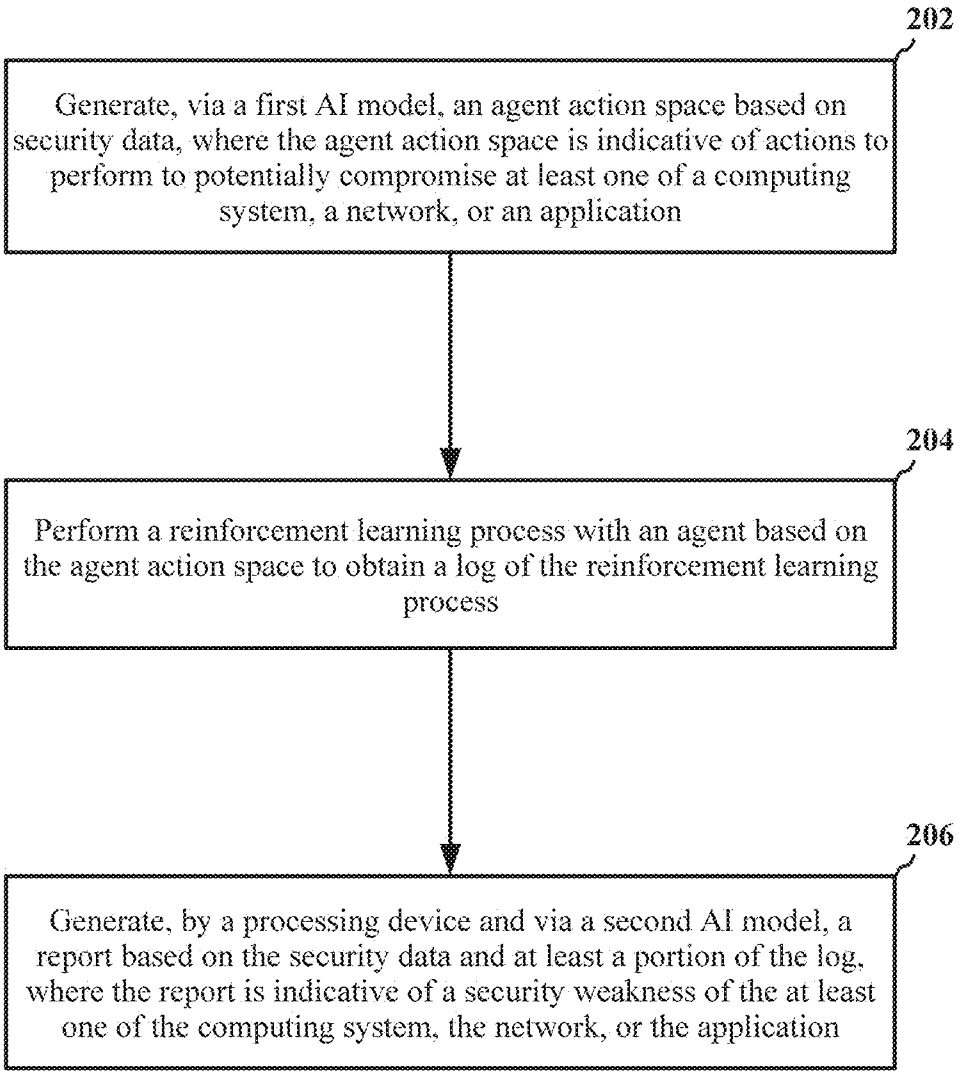
FIG. 2 is a flow diagram of a method of cybersecurity vulnerability detection with AI models in accordance with some aspects of the present disclosure.

FIG. 2 is a flow diagram 200 of a method of cybersecurity vulnerability detection with AI models in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the computing system referenced in FIG. 1, the processing device 404 (shown in FIG. 4), the machine shown in FIG. 5, or a combination thereof.

At block 202, a processing device generates via a first AI model, an agent action space based on security data, where the agent action space is indicative of actions to perform to potentially compromise at least one of a computing system, a network, or an application. For example, the first AI model may be or include the first AI model 110, the agent action space may be or include the agent action space 112, and the security data may be or include the security data 102.

At block 204, the processing device performs a reinforcement learning process with an agent based on the agent action space to obtain a log of the reinforcement learning process. For example, the reinforcement learning process may correspond to the AI processing 116. In an example, the log may be or include the log 124. In an example, the agent may be or include the agent 120.

At block 206, the processing device generates, via a second AI model, a report based on the security data and at least a portion of the log, where the report is indicative of a security weakness of the at least one of the computing system, the network, or the application. For example, the second AI model may be or include the second AI model 128 and the report may be or include the report 130.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

Figure 3:
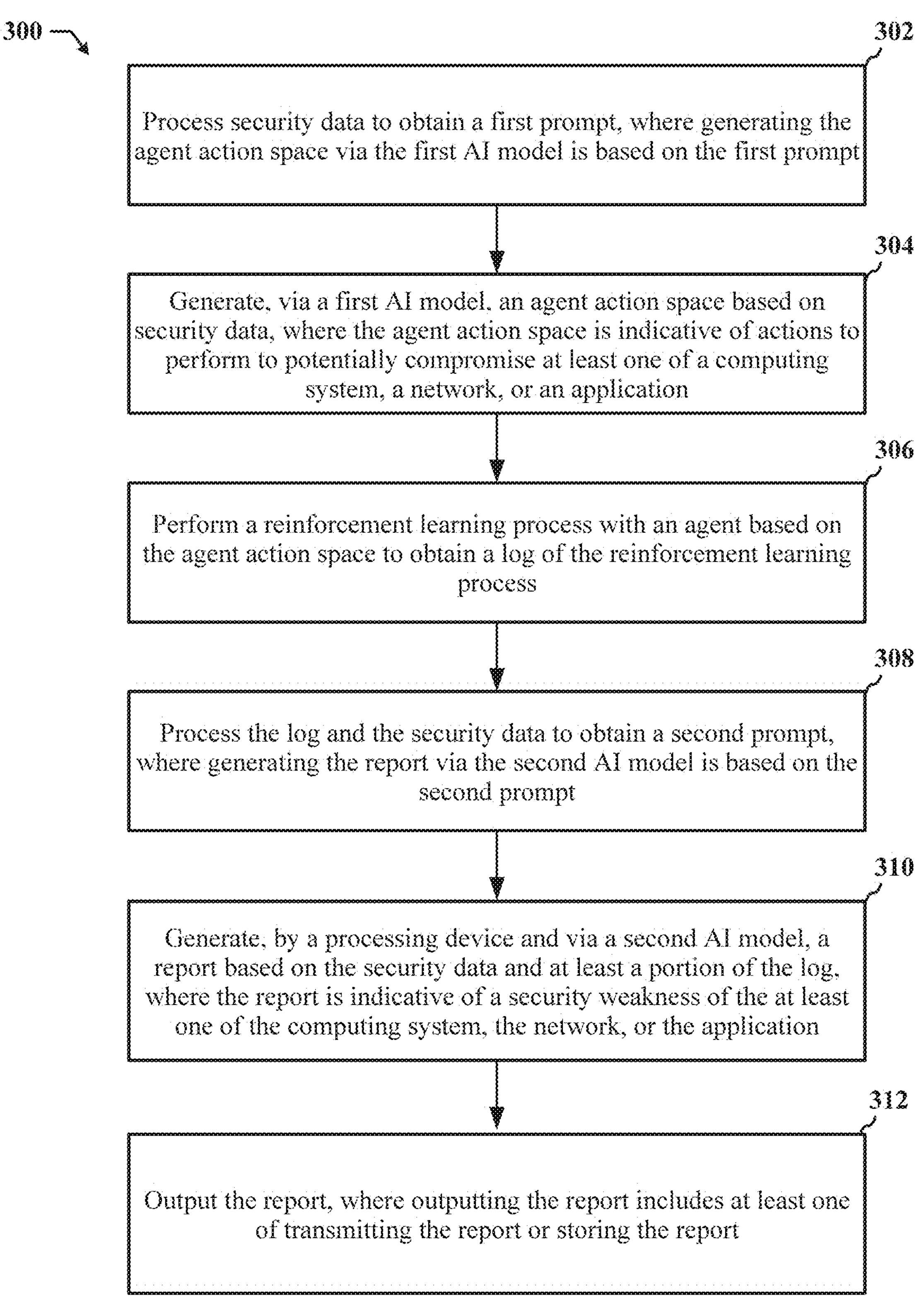
FIG. 3 is a flow diagram of a method of cybersecurity vulnerability detection with AI models in accordance with some aspects of the present disclosure.

FIG. 3 is a flow diagram 300 of a method of cybersecurity vulnerability detection with AI models in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the computing system referenced in FIG. 1, the processing device 404 (shown in FIG. 4), the machine shown in FIG. 5, or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 302, the processing device may process security data to obtain a first prompt.

At block 304, the processing device generates, via a first AI model, an agent action space based on security data, where the agent action space is indicative of actions to perform to potentially compromise at least one of a computing system, a network, or an application. In some aspects, generating the agent action space via the first AI model may be based on the first prompt. In an example, the first AI model may be or include the first AI model 110, the agent action space may be or include the agent action space 112, and the security data may be or include the security data 102. In some aspects, the security data may include at least one of a cybersecurity intelligence report (i.e., the intelligence reports 104), cybersecurity associated code from a code repository (i.e., the codebases 106), or a ticket (i.e., the tickets 108). In some aspects, the first AI model may be trained to generate agent action spaces. In some aspects, the agent action space may indicate an action that potentially compromises the at least one of the computing system, the network, or the application and metadata for the action. In some aspects, the actions may include at least one of a tactic that describes an objective, a technique that describes how the objective is achieved, or a procedure that describes an implementation of the tactic. In some aspects, generating the agent action space may include providing the security data as a first input to the first AI model and obtaining the agent action space as a first output of the first AI model. In some aspects, the first AI model includes a first LLM. In some aspects, the actions may include first actions and second actions, wherein the first actions may be indicated by the security data, and where the second actions may not be indicated by the security data.

At block 306, the processing device performs a reinforcement learning process with an agent based on the agent action space to obtain a log of the reinforcement learning process. For example, the reinforcement learning process may correspond to the AI processing 116. In an example, the log may be or include the log 124. In some aspects, performing the reinforcement learning process may include determining a policy based on the agent action space and a reward function, where the log of the reinforcement learning process may be based on the policy, and where the log may include parameters of the reinforcement learning process. In some aspects, generating the agent action space may include generating code corresponding to the actions via the first AI model, and performing the reinforcement learning process may include executing the code in an environment (e.g., the environment 118). In an example, the agent may be or include the agent 120.

At block 308, the processing device may process the log and the security data to obtain a second prompt.

At block 310, the processing device generates, via a second AI model, a report based on the security data and at least a portion of the log, where the report is indicative of a security weakness of the at least one of the computing system, the network, or the application. In some aspects, generating the report via the second AI model may be based on the second prompt. In an example, the second AI model may be or include the second AI model 128 and the report may be or include the report 130. In some aspects, the second AI model may be trained to generate reports. In some aspects, the report (i.e., a red team report) may include at least one of an indication of a subset of the actions that lead to the security weakness (i.e., the subset of actions 132), observations (i.e., the observations 134) corresponding to the subset of the actions, or recommendations (i.e., the recommendations 136) for mitigating the security weakness. In some aspects, the security weakness may include a gap or a vulnerability in the at least one of the computing system, the network, or the application. In some aspects, generating the report may include providing the at least the portion of the log and the security data as a second input to the second AI model and obtaining the report as a second output of the second AI model. In some aspects, the second AI model may include a second LLM.

At block 312, the processing device may output the report, where outputting the report may include at least one of transmitting the report or storing the report.

Figure 4:
FIG. 4 is a block diagram that illustrates an example of a system for cybersecurity vulnerability detection with AI models in accordance with some aspects of the present disclosure.
Figure 4:
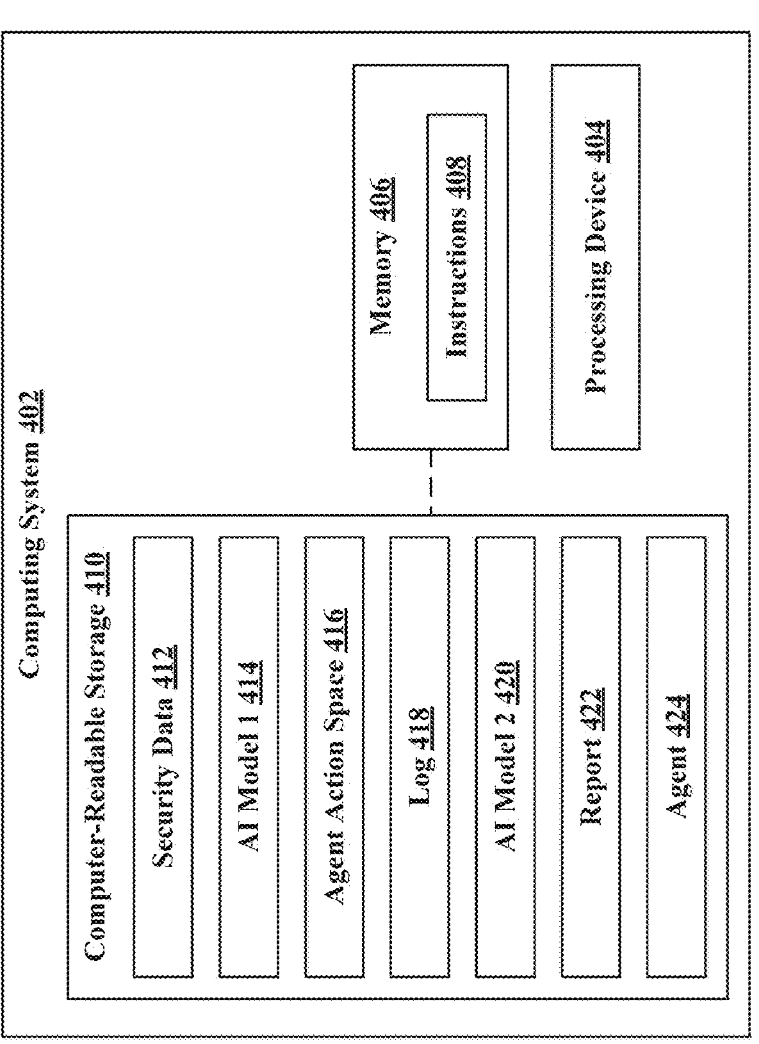

FIG. 4 is a block diagram 400 that illustrates an example of a system for cybersecurity vulnerability detection with AI models in accordance with some aspects of the present disclosure. In some aspects, a computing system 402 may perform some or all of the functionality described herein. The computing system 402 includes a processing device 404 and memory 406. The memory 406 stores instructions 408 that are executed by the processing device 404. The computing system 402 further includes computer-readable storage 410. In some aspects, a portion of the computer-readable storage 410 may include the memory 406. In some aspects, the computer-readable storage 410 may include persistent storage. Persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The computing system 402 may include any suitable type of computing device or machine that has a programmable processor including, for example, server computers, desktop computers, laptop computers, tablet computers, smartphones, set-top boxes, etc. In some examples, the computing system 402 may include a single machine or may include multiple interconnected machines (e.g., multiple servers configured in a cluster). The computing system 402 may be implemented by a common entity/organization or may be implemented by different entities/organizations. The computing system 402 may execute or include an operating system (OS). The OS of computing system 402 manage the execution of other components (e.g., software, applications, etc.) and/or may manage access to the hardware (e.g., processors, memory, storage devices, etc.) of the computing system 402.

The instructions 408, when executed by the processing device 404, cause the processing device 404 to generate, via a first AI model 414, an agent action space 416 based on security data 412, where the agent action space is indicative of actions to perform to potentially compromise at least one of a computing system, a network, or an application. The instructions 408, when executed by the processing device 404, further cause the processing device 404 to perform a reinforcement learning process with an agent 424 based on the agent action space 416 to obtain a log 418 of the reinforcement learning process. The instructions 408, when executed by the processing device 404, further cause the processing device 404 to generate, via a second AI model 420, a report 422 based on the security data and at least a portion of the log 418, where the report 422 is indicative of a security weakness of the at least one of the computing system, the network, or the application. In some aspects, the security data 412, the first AI model 414, the agent action space 416, the log 418, the second AI model 420, the report 422, and/or the agent 424 may be stored in the computer-readable storage 410.

Figure 5:
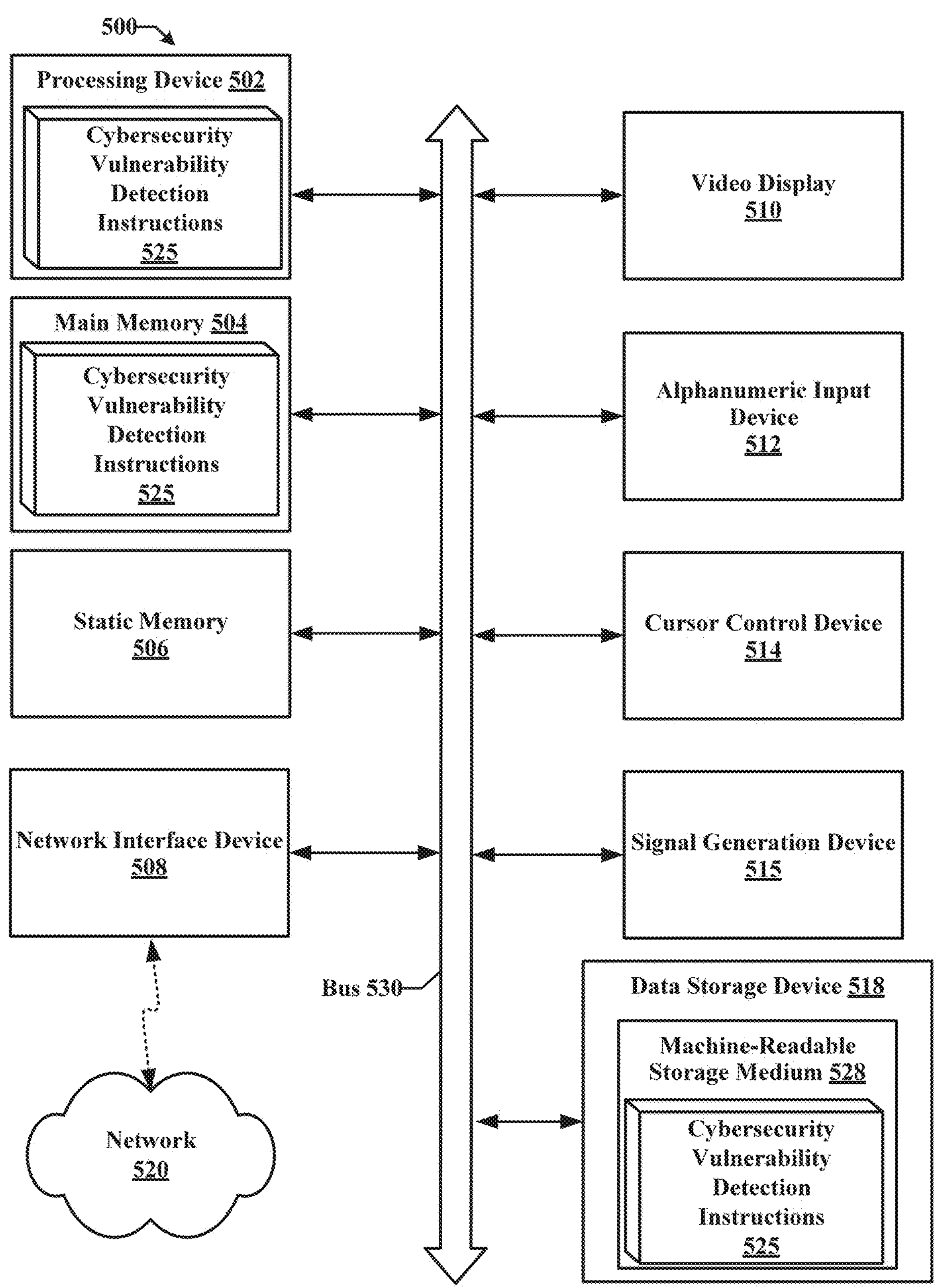
FIG. 5 is a block diagram of an example of a computing device that may perform one or more of the operations described herein in accordance with some aspects of the present disclosure.

FIG. 5 illustrates a diagrammatic representation of a machine in the example form of a computer system 500 within which a set of instructions reside for causing the machine to perform any one or more of the methodologies discussed herein for cybersecurity vulnerability detection with AI models.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, the computer system 500 may be representative of a server.

The computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 500 may further include a network interface device 508 which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 515 (e.g., an acoustic signal generation device, such as a speaker). In some embodiments, the video display unit 510, the alphanumeric input device 512, and the cursor control device 514 may be combined into a single component or device (e.g., an LCD touch screen).

The processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute cybersecurity vulnerability detection instructions 525, for performing the operations and steps discussed herein. For example, the cybersecurity vulnerability detection instructions 525 may include instructions for generating, via a first AI model, an agent action space based on security data, where the agent action space is indicative of actions to perform to potentially compromise at least one of a computing system, a network, or an application. The cybersecurity vulnerability detection instructions 525 may include instructions for performing a reinforcement learning process with an agent based on the agent action space to obtain a log of the reinforcement learning process. The cybersecurity vulnerability detection instructions 525 may include instructions for generating, by a processing device and via a second AI model, a report based on the security data and at least a portion of the log, where the report is indicative of a security weakness of the at least one of the computing system, the network, or the application.

The data storage device 518 may include a machine-readable storage medium 528 that stores the cybersecurity vulnerability detection instructions (e.g., software) embodying any one or more of the methodologies of functions described herein. The cybersecurity vulnerability detection instructions 525 may also reside, completely or at least partially, within the main memory 504 or within the processing device 502 during execution thereof by the computer system 500; the main memory 504 and the processing device 502 also constituting machine-readable storage media. The cybersecurity vulnerability detection instructions 525 may further be transmitted or received over a network 520 via the network interface device 508.

While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "generating," "performing," "obtaining," "inputting," "outputting," "transmitting," "receiving," "providing," "processing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:

generating, via a first artificial intelligence (AI) model, an agent action space based on security data, wherein the agent action space is indicative of actions to perform to potentially compromise at least one of a computing system, a network, or an application;

performing a reinforcement learning process with an agent based on the agent action space to obtain a log of the reinforcement learning process, wherein performing the reinforcement learning process comprises determining a policy based on the agent action space and a reward function, wherein the log of the reinforcement learning process is based on the policy, and wherein the log includes parameters of the reinforcement learning process; and generating, by a processing device and via a second AI model, a report based on the security data and at least a portion of the log, wherein the report is indicative of a security weakness of the at least one of the computing system, the network, or the application.

2. The method of claim 1, wherein the security data comprises at least one of:

a cybersecurity intelligence report;

cybersecurity associated code from a code repository; or a support ticket.

3. The method of claim 1, wherein the first AI model is trained to generate agent action spaces, and wherein the second AI model is trained to generate reports.

4. The method of claim 1, wherein the report comprises at least one of an indication of a subset of the actions that lead to the security weakness, observations corresponding to the subset of the actions, or recommendations for mitigating the security weakness.

5. The method of claim 1, wherein the agent action space indicates an action that potentially compromises the at least one of the computing system, the network, or the application and metadata for the action.

6. The method of claim 1, wherein the security weakness comprises a gap or a vulnerability in the at least one of the computing system, the network, or the application.

7. The method of claim 1, further comprising:

outputting the report, wherein outputting the report comprises at least one of transmitting the report or storing the report.

8. The method of claim 1, wherein the actions comprise at least one of a tactic that describes an objective, a technique that describes how the objective is achieved, or a procedure that describes an implementation of the tactic.

9. The method of claim 1, wherein generating the agent action space comprises providing the security data as a first input to the first AI model and obtaining the agent action space as a first output of the first AI model, and wherein generating the report comprises providing the at least the portion of the log and the security data as a second input to the second AI model and obtaining the report as a second output of the second AI model.

10. The method of claim 1, wherein the first AI model comprises a first large language model (LLM) and the second AI model comprises a second LLM.

11. The method of claim 1, wherein the actions include first actions and second actions, wherein the first actions are indicated by the security data, and wherein the security data is devoid of the second actions.

12. The method of claim 1, wherein generating the agent action space comprises generating code corresponding to the actions via the first AI model, and wherein performing the reinforcement learning process comprises executing the code in an environment.

13. The method of claim 1, further comprising:

processing the security data to obtain a first prompt, wherein generating the agent action space via the first AI model is based on the first prompt; and processing the log and the security data to obtain a second prompt, wherein generating the report via the second AI model is based on the second prompt.

14. A system, comprising:

a memory; and a processing device, operatively coupled to the memory, to:

generate, via a first artificial intelligence (AI) model, an agent action space based on security data, wherein the agent action space is indicative of actions to perform to potentially compromise at least one of a computing system, a network, or an application;

perform a reinforcement learning process with an agent based on the agent action space to obtain a log of the reinforcement learning process, wherein performing the reinforcement learning process comprises determining a policy based on the agent action space and a reward function, wherein the log of the reinforcement learning process is based on the policy, and wherein the log includes parameters of the reinforcement learning process; and generate, via a second AI model, a report based on the security data and at least a portion of the log, wherein the report is indicative of a security weakness of the at least one of the computing system, or the network.

15. The system of claim 14, wherein the security data comprises at least one of:

a cybersecurity intelligence report;

cybersecurity associated code from a code repository; or a ticket.

16. The system of claim 14, wherein the report comprises at least one of an indication of a subset of the actions that lead to the security weakness, observations corresponding to the subset of the actions, or recommendations for mitigating the security weakness.

17. A non-transitory computer-readable medium, having instructions stored thereon which, when executed by a processing device, cause the processing device to:

generate, via a first artificial intelligence (AI) model, an agent action space based on security data, wherein the agent action space is indicative of actions to perform to potentially compromise at least one of a computing system, a network, or an application;

perform a reinforcement learning process with an agent based on the agent action space to obtain a log of the reinforcement learning process, wherein performing the reinforcement learning process comprises determining a policy based on the agent action space and a reward function, wherein the log of the reinforcement learning process is based on the policy, and wherein the log includes parameters of the reinforcement learning process; and generate, by the processing device and via a second AI model, a report based on the security data and at least a portion of the log, wherein the report is indicative of a security weakness of the at least one of the computing system, the network, or the application.

18. The non-transitory computer-readable medium of claim 17, wherein the first AI model comprises a first large language model (LLM) and the second AI model comprises a second LLM.

19. The non-transitory computer-readable medium of claim 17, wherein the actions include first actions and second actions, wherein the first actions are indicated by the security data, and wherein the security data is devoid of the second actions.

20. The non-transitory computer-readable medium of claim 17, wherein the security data comprises at least one of:

a cybersecurity intelligence report;

cybersecurity associated code from a code repository; or a ticket.

* * * * *